United States Patent [19]
Uchida et al.

[11] Patent Number: 6,162,529
[45] Date of Patent: Dec. 19, 2000

[54] FILM ROLL OF A THERMOPLASTIC RESIN FILM

[75] Inventors: Toshikazu Uchida; Mitsuo Tojo; Toshifumi Osawa, all of Sagamihara, Japan

[73] Assignee: Teijin Limited, Osaka, Japan

[21] Appl. No.: 09/085,105

[22] Filed: May 28, 1998

[30] Foreign Application Priority Data

May 29, 1997 [JP] Japan ..................................... 9-139830
Oct. 9, 1997 [JP] Japan ..................................... 9-277019

[51] Int. Cl.⁷ ..................................................... B32B 23/02
[52] U.S. Cl. .......................... 428/194; 428/141; 428/364; 242/160.1; 242/525
[58] Field of Search .................................... 428/141, 364, 428/409, 906, 194; 242/160.1, 525, 525.5, 525.6, 534

[56] References Cited

U.S. PATENT DOCUMENTS

| | | |
|---|---|---|
| 3,536,273 | 10/1970 | Hawkins . |
| 3,801,036 | 4/1974 | Hasler ..................................... 242/56.2 |
| 5,023,142 | 6/1991 | Hetzler et al. ........................... 428/500 |
| 5,328,745 | 7/1994 | Kurihara et al. ........................ 428/141 |
| 5,595,819 | 1/1997 | Anderson et al. ....................... 428/330 |
| 5,618,609 | 4/1997 | Chujo et al. ............................. 428/141 |
| 5,620,774 | 4/1997 | Etchu et al. ............................. 428/148 |
| 5,656,356 | 8/1997 | Masuda et al. .......................... 428/141 |

FOREIGN PATENT DOCUMENTS 50-031585  10/1975  Japan .

*Primary Examiner*—William Krynski
*Assistant Examiner*—B. Shewareged
*Attorney, Agent, or Firm*—Sughrue, Mion, Zinn, Macpeak & Seas, PLLC

[57] ABSTRACT

A film roll in which the distance from the center line of the film roll to the edge of the film extending in a film winding direction is slightly changed in a film breadthwise direction.

11 Claims, No Drawings

FILM ROLL OF A THERMOPLASTIC RESIN FILM

DETAILED DESCRIPTION OF THE INVENTION

The present invention relates to a film roll of a thermoplastic resin film. More specifically, it relates to a film roll in which the distance from the center line of the film roll to the edge of the film extending in a film winding direction is slightly changed in a film breadthwise direction.

A thermoplastic resin film typified by a polyester film has been commercialized and stored in the form of a roll, which is extremely effective in handling, rather than in the form of a sheet.

Further, the thermoplastic resin film is slit with a razor blade, shear blade or the like and rolled to meet user's needs. In order to prevent the film as a product from being rolled in a bad shape due to non-uniformity in film thickness, that is, to prevent the roll of the film from being partially swollen by the successive overlapping of thick portions or recessed by the successive overlapping of thin portions of the film, a technology for slitting the film in a weaving line, for example, a slit width of 10 cm and a cycle of 1 km, without changing the slit width of the film, is employed in most cases to diminish non-uniformity in thickness.

However, even in such a case, the film edges are made uniform extremely precisely in order to roll the film into a good shape.

When the edges of the film are made uniform extremely precisely so as to prevent the edge surface of the film roll from becoming irregular as described above, the shape of the resulting roll is actually good. However, it has been found that the following problem arises when the film is actually used.

That is, the film is used by a user not immediately after production, but after a while from production in most cases. Further, when the film is slit, the section of the film (resin) is warped by cutting and the cut portion is locally thicker than other portions. High pressure is locally applied to this edge face portion which has become thick locally (called high-edge portion) by contact pressure or tension exerted when the film is wound, and blocking occurs between the high-edge portions of the film while it is stored after production, thereby causing a process trouble such as the breakage of the film.

It is therefore an object of the present invention to provide a film roll of a slit thermoplastic resin film in which high-edge portions are not overlapped with one another and blocking does not occur on the edge face of the film.

Other objects and advantages of the present invention will become apparent from the following description.

According to the present invention, the above objects and advantages of the present invention can be attained by a film roll of a thermoplastic resin film in which (1) distance between at least one of the two film ends extending in a film winding direction of the film roll and the center line of the film roll changes in the film winding direction of the film roll, (2) the center line average surface roughness $Ra^E$ of each of the two edge faces of the film roll is in the range of 3 to 200 $\mu$m, (3) the maximum depth of the concave portion of the edge faces of the film roll is in the range of 50 to 5,000 $\mu$m, and (4) the distance between the apices of two adjacent convex portions in a diametric direction of the edge face is in the range of 200 to 1,000 $\mu$m.

The film roll of the present invention is a roll of a thermoplastic resin film. The distance between at least one of the two film ends extending in a film winding direction of the film roll and the center line of the film roll changes in the film winding direction of the film roll as described in (1) above. Distance may change between only one film end and the center line or between both the film ends and the center line as described above. The center line of the film roll is defined as a straight line parallel to the film winding direction at a middle point of the distance between the two ends of the film where the distance from an arbitrary straight line parallel to the film winding direction becomes maximum. The distance between the two ends of the film is defined as the distance between a straight line, parallel to the arbitrary straight line and drawn at one end of the film where the distance from the arbitrary straight line is maximum, and a straight line, parallel to the arbitrary straight line and drawn at the other end of the film where the distance from the arbitrary straight line, is maximum.

The change of the distance in (1) above is that at least one of the two film ends extending in a film winding direction of the film roll satisfies the following equations (1) to (4):

when $0 \leq x \leq k_1$ and $12.5 \leq k_1 \leq 2.5 \times 10^6$, $$y = ax \tag{1}$$

wherein y is a difference (mm) between the distance from the center line of the film roll to any position of the end of the film in a film breadthwise direction and the distance from the center line of the film roll to a position of the end of the film where the distance from the center line of the film roll in the film breadthwise direction is minimum, x is a distance (mm) in a film winding direction from the position of the end of the film where the distance from the center line of the film roll in the film breadthwise direction is minimum, to any position of the end of the film, and $4 \times 10^{-6} \leq a \leq 4 \times 10^{-3}$,
when $k_1 \leq x \leq k_2$, $12.5 \leq k_1 \leq 2.5 \times 10^6$ and $12.5 \leq k_2 \leq 3.5 \times 10^6$, $$y = b \tag{2}$$

wherein x and y are the same as defined in the above equation (1), and $0.05 \leq b \leq 10$,
when $k_2 \leq x \leq k_3$, $12.5 \leq k_2 \leq 3.5 \times 10^6$ and $25 \leq k_3 \leq 6 \times 10^6$, $$y = -cx + d \tag{3}$$

wherein x and y are the same as defined in the above formula (1), and $4 \times 10^{-6} \leq c \leq 4 \times 10^{-3}$ and $1 \leq d \leq 24$, and
when $k_3 \leq x \leq k_4$, $25 \leq k_3 \leq 6 \times 10^6$ and $25 \leq k_4 \leq 7 \times 10^7$, $$y = e \tag{4}$$

wherein x and y are the same as defined in the above equation (1), and $0 \leq e \leq 5$ (provided that $k_1 \leq k_2 < k_3 \leq k_4$). Alternatively, the change is that at least one of the two film ends extending in the film winding direction satisfies the following equation (5):
when $0 \leq x \leq k$ and $0 \leq k \leq 7 \times 10^6$, $$y = A\{\sin(ax + 3/2 \times \pi) + 1\} \tag{5}$$

wherein $\pi/(7 \times 10^6) \leq a \leq \pi/(1 \times 10^3)$ and $0.05 \leq A \leq 10$, and x and y are the same as defined in the above equation (1). The change which satisfies the equation (5) out of the above equations is preferred for practical application.

The change of the end(s) of the film can be easily controlled by a programmed computer when the film is slit.

As described in (2) above, the film roll of the present invention is characterized in that the center line average surface roughness $Ra^E$ of the edge face of the film roll is in the range of 3 to 200 µm. When $Ra^E$ is less than 3 µm, high pressure is applied to a high-edge portion and blocking occurs between the high-edge portions of the film, thereby causing a process trouble such as the breakage of the film. On the other hand, when $Ra^E$ is more than 200 µm, the film is rolled in a bad shape disadvantageously.

$Ra^E$ is preferably in the range of 5 to 200 µm, more preferably 5 to 100 µm, particularly preferably 10 to 100 µm.

As described in (3) above, the film roll of the present invention is further characterized in that the maximum depth of the concave portion of the end face is in the range of 50 to 5,000 µm. This maximum depth is preferably in the range of 50 to 3000 µm, more preferably 100 to 2000 µm.

As described in (4) above, the film roll of the present invention is still further characterized in that the distance between the apices of two adjacent convex portions in a diametric direction of the edge face is in the range of 200 to 1,000 µm. This distance is preferably in the range of 200 to 800 µm, more preferably 300 to 800 µm.

Any thermoplastic resin films are acceptable as the thermoplastic resin film of the present invention. The thermoplastic resin film which the present invention concerns is preferably an aromatic polyester film, particularly preferably a biaxially oriented polyethylene terephthalate (PET) film or a biaxially oriented polyethylene-2,6-naphthalene dicarboxylate (PEN) film.

The thermoplastic resin film used in the present invention may contain such additives as a stabilizer, a colorant and an antistatic agent. It is particularly preferred to have various inert solid fine particles contained in the polymer to make the film surface rough so as to improve slipperiness.

A biaxially oriented aromatic polyester film which is one of the thermoplastic resin films used in the present invention can be produced by melt-extruding a fully dried aromatic polyester at a temperature between its melting point and (melting point +70)° C. and quenching it on a casting drum to obtain an unstretched film, biaxially stretching the unstretched film sequentially or simultaneously, and heat setting the biaxially oriented film. The biaxial stretching is preferably sequential biaxial stretching. The unstretched film is preferably stretched to 2.3 to 6.5 times in a longitudinal direction at 70 to 170° C. and to 2.3 to 6.5 times in a transverse direction by a stenter at 70 to 150° C., and then heat set at 150 to 250° C. under tension or under limited shrinkage. The heat setting time is preferably 10 to 30 seconds. The stretching conditions of the film in the longitudinal and transverse directions are preferably such conditions that the physical properties of the obtained biaxially oriented polyester film should satisfy required properties, for example, that physical properties of the film stretched in one direction should be almost equal to those in the other direction. In the case of simultaneous biaxial stretching, the above stretching temperature, stretching ratios, heat setting temperature and the like can be applied.

So-called three-stage or four-stage stretching that the biaxially oriented polyester film is further stretched in a longitudinal direction and/or transverse direction may be employed as required. In the four-stage stretching, the unstretched film is stretched to 1.8 to 2.8 times in a longitudinal direction at 70 to 150° C. and to 3.5 to 5 times in a transverse direction by a stenter, heat set (intermediate heat setting) at 100 to 170° C. for 10 to 30 seconds, stretched to 1.5 to 3.0 times in a longitudinal direction at 110 to 180° C. and to 1.2 to 2.4 times in a transverse direction by the stenter at 110 to 190° C., and further heat set at 150 to 250° C. for 10 to 30 seconds under tension.

The thus produced biaxially oriented aromatic polyester film to be used in the present invention preferably has a thickness of 1 to 500 µm, more preferably 3 to 350 µm, particularly preferably 3 to 25 µm.

The film used in the present invention preferably has a center line average surface roughness $Ra^S$ of at least one surface in the range of 10 nm or less. The film may be a multi-layer laminate film consisting of two or more layers.

In the slit film to be used for the film roll of the present invention, when the change of (1) above satisfies the above equations (1) to (4), it is a periodical change that one cycle is formed by changing x from 0 to $k_4$, whereas when the change of (1) above satisfies the above equation (5), it is a periodical change that one cycle is formed by changing x from 0 to k.

The width of the film roll of the present invention can be in the range of 100 mm to 5 m, preferably 100 mm to 1,500 mm. The diameter of the film roll can be in the range of 100 mm to 1 m, preferably 200 mm to 800 mm. The length of the rolled film is preferably in the range of 1,000 to 50,000 m, more preferably 3,000 m to 30,000 m.

The thermoplastic resin film, particularly biaxially oriented aromatic polyester film, forming the film roll of the present invention is advantageously used as a base film for a magnetic recording medium.

The following examples are given to further illustrate the present invention.

The values of properties in the present invention were measured and defined as follows:

(a) Center Line Average Surface Roughness

Replicas of 5 arbitrary sites of the edge face portion of the roll are prepared with a mixture of DE-SI-CON of Toyo Kagaku Kenkyusho and a special curing agent. The replicas are cut in a diametric direction of the roll and the cut sections thereof are observed through a microscope. A photomicrograph of each of the sections is taken in such a way that the length (Lx) in the diametric direction of the roll is to be in the range of 1 to 5 mm.

The images of the photomicrographs are processed by the LEX-FS image processing analyzer of Nifleco Co., Ltd. and a value obtained from the following equation is defined as film surface roughness when the obtained center line roughness is expressed by z=f(x).

$$Ra^E = \frac{1}{L(x)} \cdot \int_0^{LX} |f(x)| dx$$

(2) Depth of Concave Portion and Interval Between Apices of Two Convex Portions of Edge Face of Film Roll To measure the depth of a concave portion and the interval between the apices of two adjacent convex portions of the edge face of a film roll, replicas of 5 sites prepared in the same manner as in the above measurement of the "surface roughness" are cut in a direction parallel to the diametric direction of the roll, a photomicrograph of each of the sections is taken in such a way that the length (Lx) in the diametric direction of the film roll is to be 5 mm, and the average value of the 5 maximum lengths out of Lx's is defined as the depth of the concave portion of the edge face.

The average value of five minimum intervals between the apices of adjacent convex portions spaced apart from each other by 0.1 mm or more is defined as the interval between apices.

EXAMPLE 1

Dimethyl terephthalate and ethylene glycol were polymerized in accordance with a commonly used method by adding manganese acetate as an ester interchange catalyst, antimony trioxide as a polymerization catalyst and phosphorous acid as a stabilizer to obtain polyethylene terephthalate A which contained substantially no inert particles.

Polyethylene terephthalate B containing silica particles having an average particle diameter of 0.5 μm was obtained in the same manner as described above.

These polyethylene terephthalates A and B were dried at 170° C. for 3 hours and supplied separately to two extruders to be melt extruded at a melting temperature of 290° C. using a multi-manifold co-extrusion die. A sheet extruded from the die was quenched to obtain a 82 μm-thick unstretched film.

The obtained unstretched film was preheated, stretched to 3.2 times in a longitudinal direction between low-speed and high-speed rolls at a film temperature of 95° C., and quenched. Thereafter, a water-soluble coating solution containing a water-soluble acryl-modified polyester resin and acryl particles having an average particle diameter of 30 nm was coated on the polyethylene terephthalate A side of the longitudinally stretched film to a thickness of 0.005 μm (0.015 μm after stretching and drying). The coated film was then supplied to a stenter to be stretched to 4.1 times in a transverse direction at 110° C. The obtained biaxially oriented film was heat set with hot air at 220° C. for 4 seconds to obtain a 5.9 μm-thick biaxially oriented laminate polyester film.

This laminate film was slit to ensure that one end of the film in a film winding direction satisfies the following equations (1)' to (4)' and that the other end of the film also satisfies the same equations, and 5,000 m of this slit laminate film was wound around a rubber roll having an Asker hardness of 50° to a width of 500 mm at a contact pressure of 50 kg/m.

$$y = 4 \times 10^{-5} x (0 \leq x \leq 25{,}000) \quad (1)'$$

$$y = 1.0 (x = 25{,}000 \text{ to } 28{,}000) \quad (2)'$$

$$y = -4 \times 10^{-5} x + 2.12 (28{,}000 \leq x \leq 53{,}000) \quad (3)'$$

$$y = 0 (x = 53{,}000 \text{ to } 56{,}000) \quad (4)'$$

y and x are the same as defined in the above equations. The end of the film changed periodically such that one cycle was formed by changing x from the above equations (1)' to (4)'.

Other characteristic properties of the obtained roll are shown in Table 1 below.

After the roll was left to stand at a relative humidity of 80% and a temperature of 60° C. for 3 days, the film was unrolled at a rate of 100 m/min. No blocking occurred on the edge face. Therefore, the film roll was extremely good.

Comparative Example 1

A biaxially oriented polyester film was produced in the same manner as in Example 1 except that the ends of the film were not processed.

The characteristic properties of the obtained roll are shown in Table 1. The film was unrolled after it was left to stand in the same manner as in Example 1. Blocking occurred on the edge face and the film was broken while it was unrolled.

EXAMPLE 2

The same procedure of Example 1 was repeated except that the film was slit to ensure that one end of the film satisfied the following equation (5)' and the other end also satisfied the equation.

$$y = \left\{ \sin\left( \frac{\pi}{25000} \times 1\frac{3}{2}\pi \right) + 1 \right\} \quad (0 \leq x \leq 50{,}000) \quad (5)'$$

The characteristic properties of the obtained roll are shown in Table 1. This roll was left to stand in the same manner as in Example 1 and the film was unrolled and observed. No blocking occurred on the edge face and the film roll had a good shape.

TABLE 1

| | Center line average surface roughness on edge face of roll (μm) | Maximum depth of concave portion of edge face of roll (μm) | Interval between the apices of two adjacent convex portions of edge face of roll (μm) | Blocking |
| --- | --- | --- | --- | --- |
| Example 1 | 19 | 300 | 400 | No |
| Example 2 | 21 | 500 | 500 | No |
| Comparative Example 1 | 1 | 5 | — | Yes |

As described above, in the prior art, high pressure is applied to a high-edge portion, which is produced when the film is slit, by contact pressure or tension applied when the film is wound, and blocking occurs between the high-edge portions of the film, thereby causing a process trouble such as the breakage of the film.

The present invention, on the contrary, can provide a film roll of a thermoplastic resin film in which high-edge portions are not overlapped with one another and blocking does not occur on the edge face of the film.

What is claimed is:

1. A film roll of a thermoplastic resin film wherein
   (1) the distance between at least one of the two film ends extending in a film winding direction of the film roll and the center line of the film roll changes in the film winding direction of the film roll;
   (2) the center line average surface roughness $Ra^E$ of each of the two edge faces of the film roll is in the range of 3 to 200 μm;
   (3) the maximum depth of the concave portion of the edge faces of the film roll is in the range of 50 to 5,000 μm; and
   (4) the distance between the apices of two adjacent convex portions in a diametric direction of the edge face is in the range of 200 to 1,000 μm.

2. The film roll of claim 1, wherein in (1) above, the value of the change in a film breadthwise direction is in the range of 50 to 10,000 μm.

3. The film roll of claim 1, wherein the change of (1) above is that at least one of the two film ends extending in a film winding direction of the film roll satisfies the following equations (1) to (4):

when $0 \leq x \leq k_1$ and $12.5 \leq k_1 \leq 2.5 \times 10^6$, $$y = ax \tag{1}$$

wherein y is a difference (mm) between the distance from the center line of the film roll to any position of the end of the film in a film breadthwise direction and the distance from the center line of the film roll to a position of the end of the film where the distance from the center line of the film roll in the film breadthwise direction is minimum, x is a distance (mm) in a film winding direction from the position of the end of the film where the distance from the center line of the film roll in the film breadthwise direction is minimum to any position of the end of the film, and $4 \times 10^{-6} \leq a \leq 4 \times 10^{-3}$,
when $k_1 \leq x \leq k_2$, $12.5 \leq k_1 \leq 2.5 \times 10^6$ and $12.5 \leq k_2 \leq 3.5 \times 10^6$, $$y = b \tag{2}$$

wherein x and y are the same as defined in the above equation (1), and $0.05 \leq b \leq 10$,
when $k_2 \leq x \leq k_3$, $12.5 \leq k_2 \leq 3.5 \times 10^6$ and $25 \leq k_3 \leq 6 \times 10^6$, $$y = -cx + d \tag{3}$$

wherein x and y are the same as defined in the above formula (1), and $4 \times 10^{-6} \leq c \leq 4 \times 10^{-3}$ and $1 \leq d \leq 24$, and
when $k_3 \leq x \leq k_4$, $25 \leq k_3 \leq 6 \times 10^6$ and $25 \leq k_4 \leq 7 \times 10^7$, $$y = e \tag{4}$$

wherein x and y are the same as defined in the above equation (1), and $0 \leq e \leq 5$ (provided that $k_1 \leq k_2 < k_3 \leq k_4$).

4. The film roll of claim 3, wherein the change of (1) above is a periodical change that one cycle is formed by changing x from 0 to $k_4$.

5. The film roll of claim 1, wherein the change of (1) above is that at least one of the two film ends extending in a film winding direction satisfies the following equation (5):
when $0 \leq x \leq k$ and $0 \leq k \leq 7 \times 10^6$, $$y = A\{\sin(ax + 3/2 \times \pi) + 1\} \tag{5}$$

wherein $\pi/(7 \times 10^6) \leq a \leq \pi/(1 \times 10^3)$ and $0.05 \leq A \leq 10$, and x and y are the same as defined in the above equation (1).

6. The film roll of claim 5, wherein the change of (1) above is a periodical change that one cycle is formed by changing x from 0 to k.

7. The film roll of claim 1, wherein the film has a thickness of 1 to 500 μm.

8. The film roll of claim 1, which has a width of 100 mm to 5 m.

9. The film roll of claim 1, which has a diameter of 100 mm to 1 m.

10. The film roll of claim 1, which has a length of 1,000 to 50,000 m.

11. The film roll of claim 1, wherein the center line average surface roughness $Ra^S$ of at least one surface of the film is 10 nm or less.

* * * * *